(12) United States Patent
Kumar et al.

(10) Patent No.: US 11,675,917 B2
(45) Date of Patent: Jun. 13, 2023

(54) ELECTRONIC SYSTEM FOR DYNAMICALLY PERMITTING AND RESTRICTING ACCESS TO AND MODIFICATION OF COMPUTER RESOURCES

(71) Applicant: BANK OF AMERICA CORPORATION, Charlotte, NC (US)

(72) Inventors: Hitendra Kumar, Uttar Pradesh (IN); Devulapalli Venkata Lakshmi Sai Siva Kumar, Telangana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 296 days.

(21) Appl. No.: 17/237,213

(22) Filed: Apr. 22, 2021

(65) Prior Publication Data
US 2022/0343003 A1 Oct. 27, 2022

(51) Int. Cl.
*G06N 20/20* (2019.01)
*G06F 21/62* (2013.01)
(Continued)

(52) U.S. Cl.
CPC .......... *G06F 21/62* (2013.01); *G06F 9/44505* (2013.01); *G06F 9/5005* (2013.01); *G06F 21/31* (2013.01); *G06F 21/45* (2013.01); *G06F 21/602* (2013.01); *G06N 20/00* (2019.01); *G06F 2221/2107* (2013.01); *G06F 2221/2141* (2013.01)

(58) Field of Classification Search
CPC .... G06F 21/62; G06F 9/44505; G06F 9/5005; G06F 21/31; G06F 21/45; G06F 21/602; G06F 2221/2107; G06F 2221/2141; G06F 21/6218; G06N 20/00; G06N 5/01; G06N 20/20
See application file for complete search history.

(56) References Cited

U.S. PATENT DOCUMENTS 7,577,729 B1 8/2009 Umbehocker et al.
7,653,810 B2 1/2010 Thornton et al.
(Continued)

*Primary Examiner* — Joseph P Hirl
*Assistant Examiner* — Aayush Aryal
(74) *Attorney, Agent, or Firm* — Moore & Van Allen PLLC; R. W. McCord Rayburn

(57) ABSTRACT

Systems, computer program products, and methods are described herein for dynamically permitting and restricting access to and modification of computer resources. The present invention may be configured to receive a change request identifying computer resources to be modified, determine whether privileged access is required to modify the computer resources, and receive credentials from a user device. The present invention may be further configured to generate an encrypted configuration file, determine whether the change request is valid, and further encrypt the encrypted configuration file based on determining that the change request is valid. The present invention may be further configured to determine whether the credentials authorize access to the computer resources, further encrypt the encrypted configuration file based on determining that the credentials authorize access to the computer resources, and permit and restrict access of the user device to computer resources based on the encrypted configuration file.

20 Claims, 4 Drawing Sheets

(51) Int. Cl.
  *G06F 21/31*  (2013.01)
  *G06F 21/45*  (2013.01)
  *G06F 21/60*  (2013.01)
  *G06F 9/50*  (2006.01)
  *G06N 20/00*  (2019.01)
  *G06F 9/445*  (2018.01)

(56) References Cited

U.S. PATENT DOCUMENTS

| | | |
|---|---|---|
| 7,707,405 B1 | 4/2010 | Gilman et al. |
| 7,921,284 B1 * | 4/2011 | Kinghorn ............... H04L 67/01 |
| | | 713/160 |
| 8,316,429 B2 | 11/2012 | Long |
| 8,539,228 B1 * | 9/2013 | Mason ................. H04L 9/3247 |
| | | 713/176 |
| 8,724,816 B2 | 5/2014 | Shi et al. |
| 8,776,192 B2 | 7/2014 | Schiefelbein |
| 9,026,805 B2 | 5/2015 | Acar et al. |
| 9,336,324 B2 | 5/2016 | Lomme et al. |
| 9,531,754 B2 | 12/2016 | Alon et al. |
| 2010/0269156 A1 * | 10/2010 | Hohlfeld ................ H04L 9/321 |
| | | 726/4 |
| 2015/0026460 A1 * | 1/2015 | Walton ................ G06F 21/6218 |
| | | 713/165 |
| 2015/0222604 A1 * | 8/2015 | Ylonen ................ H04L 9/3263 |
| | | 713/171 |
| 2016/0044035 A1 | 2/2016 | Huang |
| 2016/0269377 A1 | 9/2016 | Ylnen |
| 2017/0163689 A1 | 6/2017 | Ylonen |
| 2019/0089708 A1 * | 3/2019 | Pattar .................... G06F 21/40 |
| 2021/0352077 A1 * | 11/2021 | Benedetti ............... G06F 16/27 |

\* cited by examiner

ELECTRONIC SYSTEM FOR DYNAMICALLY PERMITTING AND RESTRICTING ACCESS TO AND MODIFICATION OF COMPUTER RESOURCES

FIELD OF THE INVENTION

The present invention embraces an electronic system for dynamically permitting and restricting access to and modification of computer resources.

BACKGROUND

An entity may maintain and/or operate one or more systems for running applications, processing data (e.g., batch processing and/or the like), providing services to users, and/or the like. When a change and/or modification needs to be made to one or more of the systems, applications, services, and/or the like, a user (e.g., a system administrator and/or the like) may implement the change and/or modification. To prevent unauthorized access, the one or more systems may include a privileged access system that requires the user to provide credentials before implementing the change and/or modification.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, system for dynamically permitting and restricting access to and modification of computer resources is presented. The system may include at least one non-transitory storage device and at least one processing device coupled to the at least one non-transitory storage device, where the at least one processing device may be configured to receive a change request identifying computer resources to be modified, determine, using a machine learning model and based on the change request, whether privileged access is required to modify the computer resources, and receive, based on determining that privileged access is required to modify the computer resources, credentials from a user device. The at least one processing device may be configured to generate, based on the change request, a first encrypted configuration file, determine, based on the change request and based on a service management database, whether the change request is valid, and generate, based on determining that the change request is valid, a second encrypted configuration file by encrypting the first encrypted configuration file. The at least one processing device may be configured to determine, based on the credentials and a credential management database, whether the credentials authorize access to the computer resources identified by the change request and generate, based on determining that the credentials authorize access to the computer resources identified by the change request, a third encrypted configuration file by encrypting the second encrypted configuration file. The at least one processing device may be configured to permit, based on the third encrypted configuration file, the user device to modify the computer resources identified by the change request and prevent, based on the third encrypted configuration file, the user device from modifying other computer resources that are not the computer resources identified by the change request.

In some embodiments, the change request may include information identifying an event associated with modifying the computer resources, an incident associated with modifying the computer resources, a modification to be performed on the computer resources, and/or the like.

In some embodiments, the change request may include information provided by the user device to a service management tool.

In some embodiments, the change request may identify modifications to be made to the computer resources, and the first encrypted configuration file may include data identifying the modifications to be made to the computer resources. Additionally, or alternatively, the at least one processing device may be configured to permit, based on the third encrypted configuration file, the user device to perform the modifications on the computer resources and prevent, based on the third encrypted configuration file, the user device from performing modifications other than the modifications identified in the change request.

In some embodiments, the at least one processing device may be configured to, when receiving the change request, receive the change request from a service management system.

In some embodiments, the at least one processing device may be configured to, when determining whether privileged access is required to modify the computer resources, transform data associated with the change request to obtained transformed data, normalize the data associated with the change request to obtain normalized data, clean the data associated with the change request to obtain clean data, process the transformed data, the normalized data, and the cleaned data to obtain processed data, and provide, to the machine learning model, the processed data, where the machine learning model is configured to determine, based on the processed data, whether privileged access is required to modify the computer resources, and where the machine learning model is trained based on historical data associated with change requests and historical determinations of whether privileged access is required. Additionally, or alternatively, the at least one processing device may be configured to, when determining whether privileged access is required to modify the computer resources, parse, using a natural language parser, the processed data to determine whether privileged access is required to modify the computer resources.

In some embodiments, the machine learning model may include a random forest classifier.

In some embodiments, the at least one processing device may be configured to, when determining whether privileged access is required to modify the computer resources, process the change request using a privilege access detection engine including the machine learning model and a natural language parser.

In some embodiments, the at least one processing device may be configured to permit, based on determining that privileged access is not required to modify the computer resources, the user device to modify the computer resources identified by the change request.

In some embodiments, the at least one processing device may be configured to, when generating the first encrypted configuration file, generate the first encrypted configuration file based on data provided by the user device to a configuration management database.

In some embodiments, the at least one processing device may be configured to, based on determining that the change request is not valid, prevent the user device from modifying the computer resources identified by the change request and provide a notification to the user device indicating that the change request is not valid.

In some embodiments, the change request may include information identifying an event associated with modifying the computer resources, an incident associated with modifying the computer resources, a modification to be performed on the computer resources, and/or the like. Additionally, or alternatively, the at least one processing device may be configured to, when determining whether the change request is valid, determine, based on the service management database, whether the event is a valid event, determine, based on the service management database, whether the incident is a valid incident, determine, based on the service management database, whether the modification to be performed on the computer resources conflicts with another service, determine, based on the service management database, whether the modification to be performed on the computer resources overlaps with another service, and/or the like.

In some embodiments, the at least one processing device may be configured to, when generating the first encrypted configuration file, encrypt, using a first public key and a first private key, a configuration file including data provided by the user device to a configuration management database to generate the first encrypted configuration file. Additionally, or alternatively, the at least one processing device may be configured to, when generating the second encrypted configuration file, encrypt, using a second public key and a second private key, the first encrypted configuration file to generate the second encrypted configuration file. In some embodiments, the at least one processing device may be configured to, when generating the third encrypted configuration file, encrypt, using a third public key and a third private key, the second encrypted configuration file to generate the third encrypted configuration file. Additionally, or alternatively, the at least one processing device may be configured to, when determining whether the change request is valid, decrypt, using the first public key, the first encrypted configuration file to access the data of the configuration file. In some embodiments, the at least one processing device may be configured to, when determining whether the credentials authorize access to the computer resources identified by the change request, decrypt, using the second public key, the second encrypted configuration file and decrypt, using the first public key, the first encrypted configuration file to access the data of the configuration file.

In some embodiments, the system may include a service management system configured to receive the change request and receive the credentials from the user device, a privilege access detection engine configured to determine whether privileged access is required to modify the computer resources, and a privilege access network configured to generate the first encrypted configuration file, determine whether the change request is valid, generate the second encrypted configuration file, determine whether the credentials authorize access to the computer resources identified by the change request, and generate the third encrypted configuration file.

In some embodiments, the at least one processing device may be configured to, when generating the first encrypted configuration file, generate a first block of a blockchain, where the first block includes the first encrypted configuration file. Additionally, or alternatively, the at least one processing device may be configured to, when generating the second encrypted configuration file, generate a second block of the block chain, where the second block includes the second encrypted configuration file. In some embodiments, the at least one processing device may be configured to, when generating the third encrypted configuration file, generate a third block of the block chain, where the third block includes the third encrypted configuration file.

In another aspect, a computer program product for dynamically permitting and restricting access to and modification of computer resources is presented. The computer program product may include a non-transitory computer-readable medium including code causing a first apparatus to receive a change request identifying computer resources to be modified, determine, using a machine learning model and based on the change request, whether privileged access is required to modify the computer resources, and receive, based on determining that privileged access is required to modify the computer resources, credentials from a user device. The computer program product may include a non-transitory computer-readable medium including code causing the first apparatus to generate, based on the change request, a first encrypted configuration file, determine, based on the change request and based on a service management database, whether the change request is valid, and generate, based on determining that the change request is valid, a second encrypted configuration file by encrypting the first encrypted configuration file. The computer program product may include a non-transitory computer-readable medium including code causing the first apparatus to determine, based on the credentials and a credential management database, whether the credentials authorize access to the computer resources identified by the change request and generate, based on determining that the credentials authorize access to the computer resources identified by the change request, a third encrypted configuration file by encrypting the second encrypted configuration file. The computer program product may include a non-transitory computer-readable medium including code causing the first apparatus to permit, based on the third encrypted configuration file, the user device to modify the computer resources identified by the change request and prevent, based on the third encrypted configuration file, the user device from modifying other computer resources that are not the computer resources identified by the change request.

In some embodiments, the change request may include information identifying an event associated with modifying the computer resources, an incident associated with modifying the computer resources, a modification to be performed on the computer resources, and/or the like.

In yet another aspect, a method for dynamically permitting and restricting access to and modification of computer resources is presented. The method may include receiving a change request identifying computer resources to be modified, determining, using a machine learning model and based on the change request, whether privileged access is required to modify the computer resources, and receiving, based on determining that privileged access is required to modify the computer resources, credentials from a user device. The method may include generating, based on the change request, a first encrypted configuration file, determining, based on the change request and based on a service management database, whether the change request is valid, and generating, based on determining that the change request is valid, a second encrypted configuration file by encrypting the first encrypted configuration file. The method may include determining, based on the credentials and a credential management database, whether the credentials authorize access to the computer resources identified by the change request and generating, based on determining that the credentials authorize access to the computer resources identified by the change request, a third encrypted configuration file by encrypting the second encrypted configuration file. The method may include permitting, based on the third encrypted configuration file, the user device to modify the computer resources identified by the change request and preventing, based on the third encrypted configuration file, the user device from modifying other computer resources that are not the computer resources identified by the change request.

The features, functions, and advantages that have been discussed may be achieved independently in various embodiments of the present invention or may be combined with yet other embodiments, further details of which may be seen with reference to the following description and drawings.

BRIEF DESCRIPTION OF THE DRAWINGS

Figure 1:
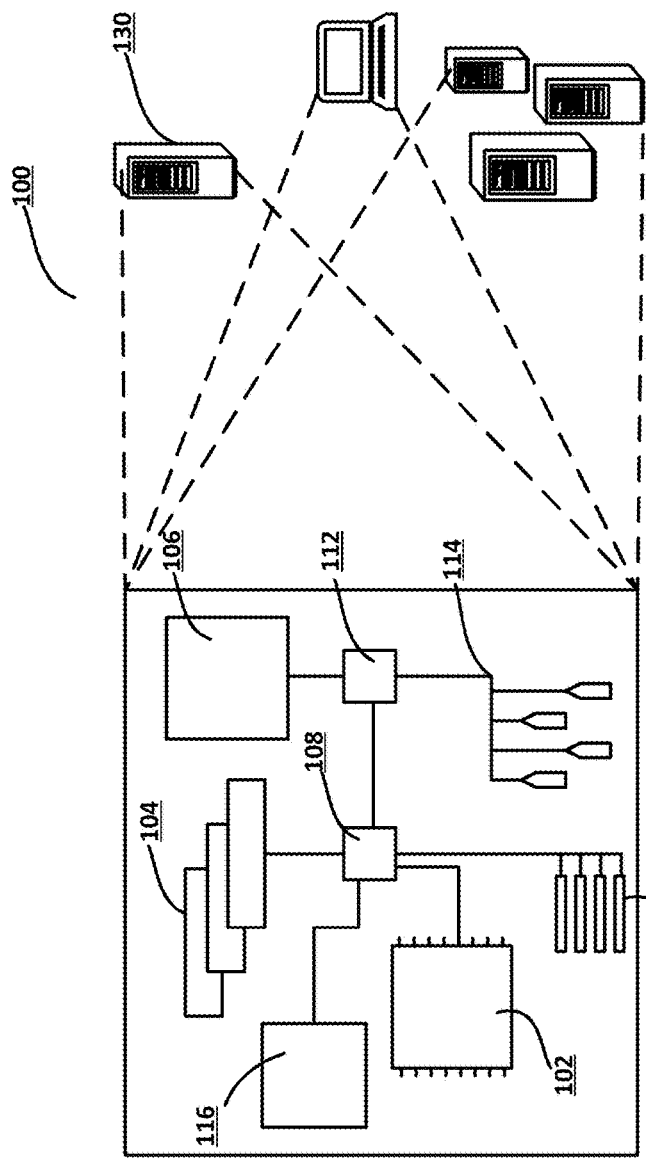
Figure 1:
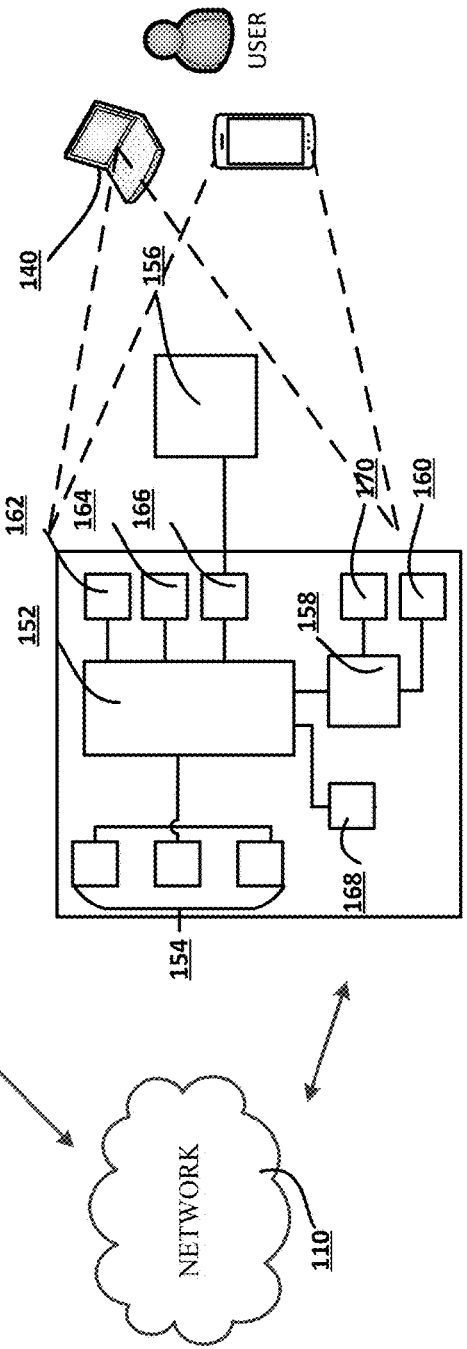
Figure 2A:
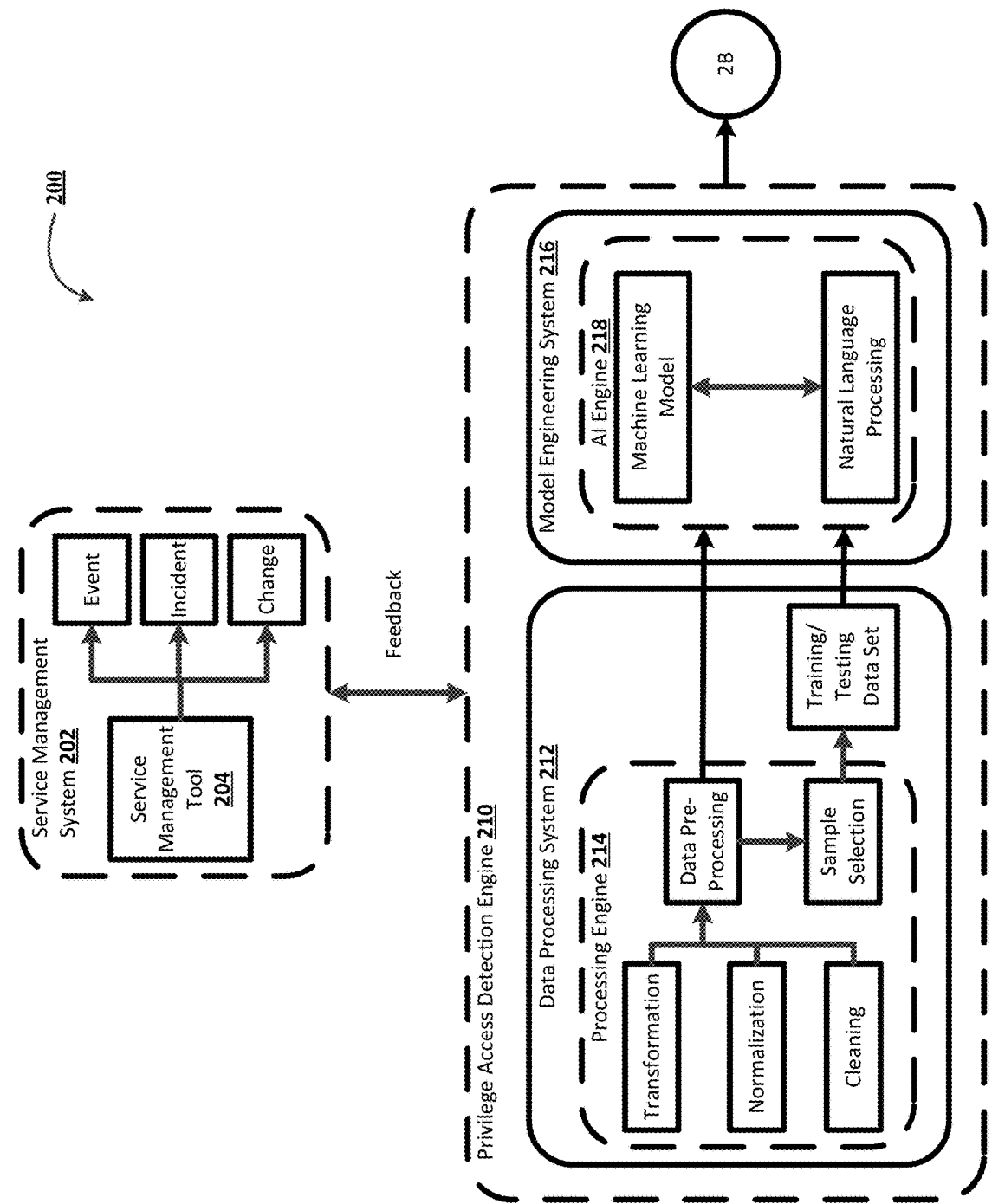
Figure 2B:
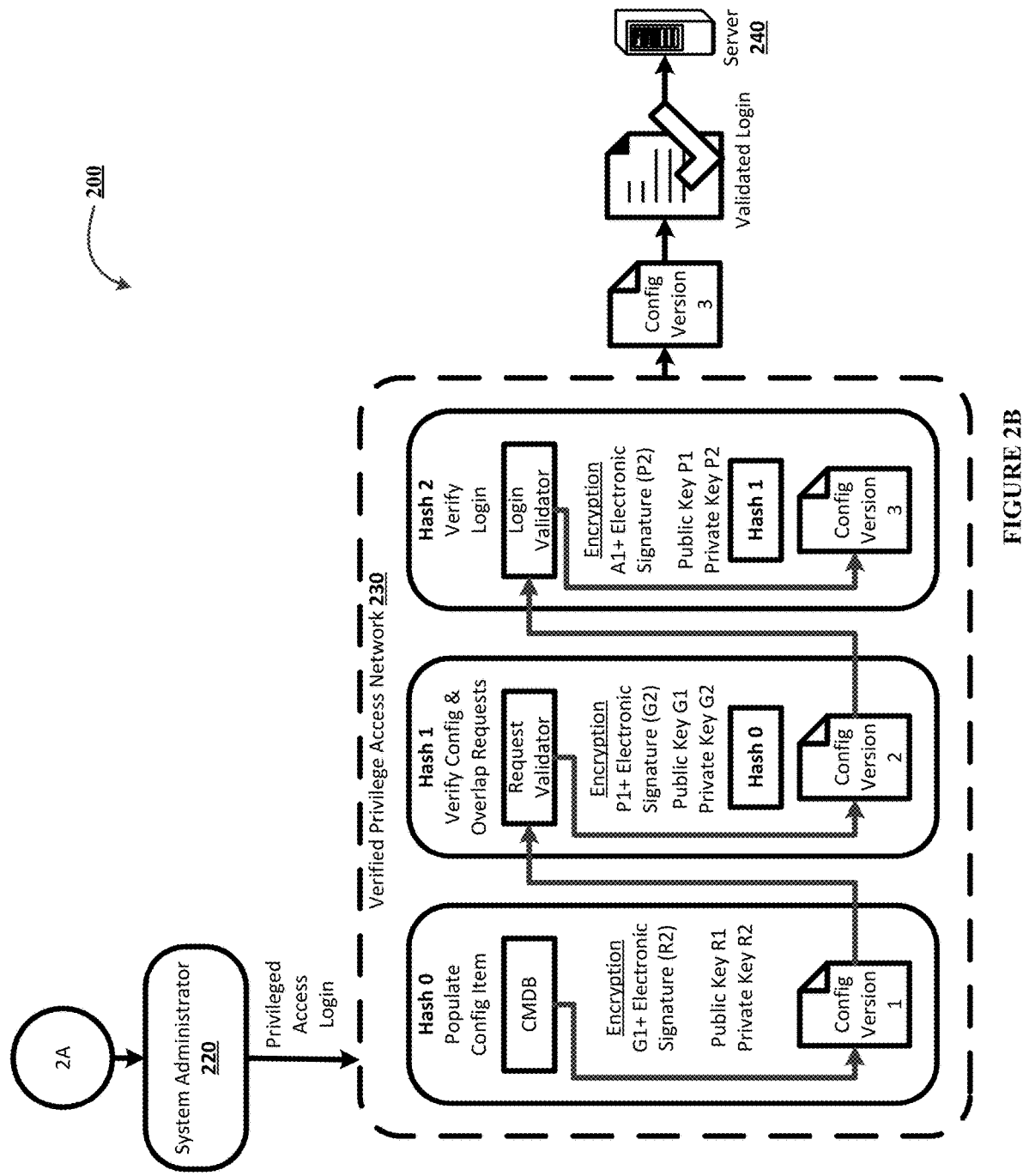
Figure 3:
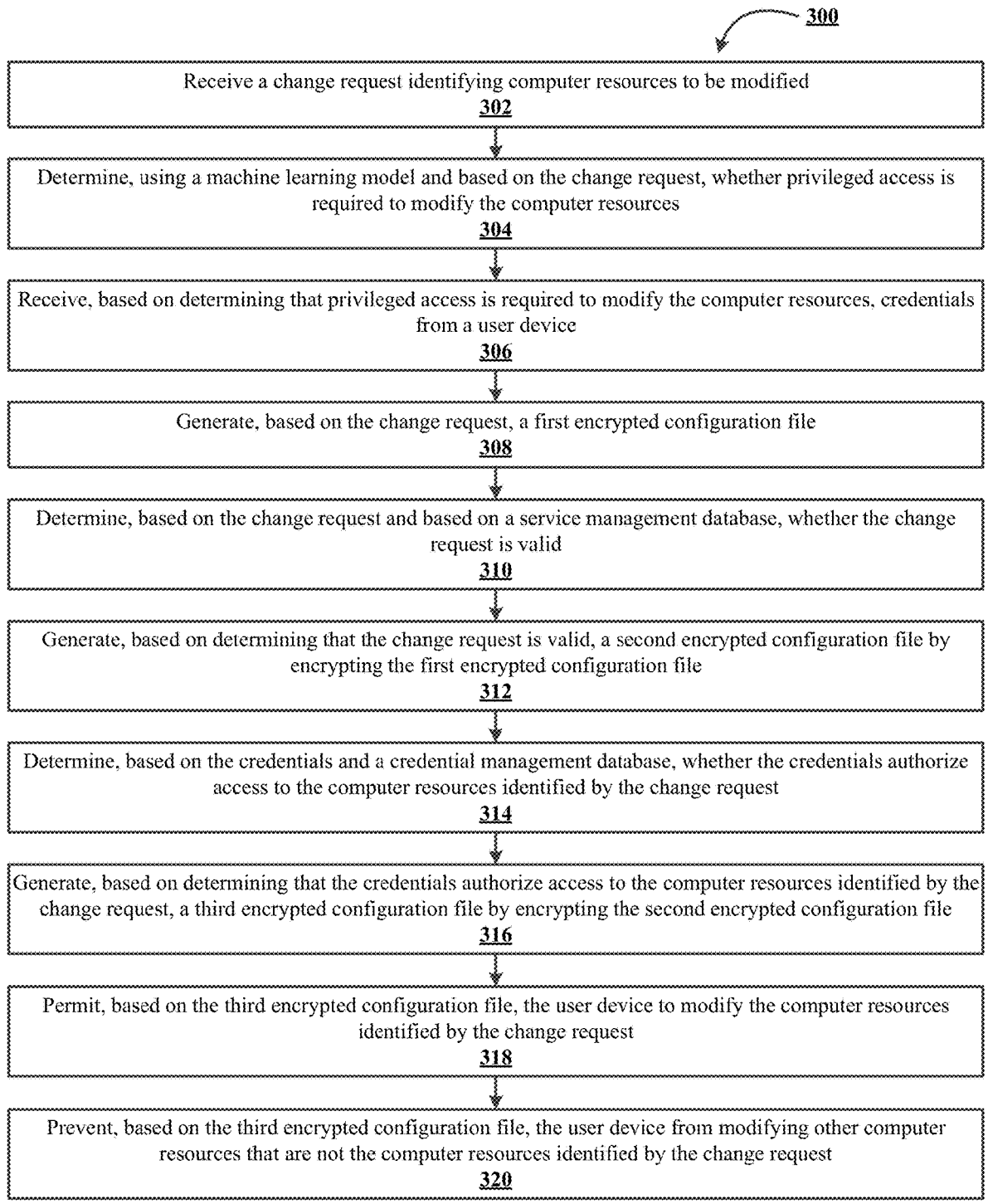

Having thus described embodiments of the invention in general terms, reference will now be made the accompanying drawings, wherein:

FIG. 1 illustrates technical components of a system for dynamically permitting and restricting access to and modification of computer resources, in accordance with an embodiment of the invention;

FIGS. 2A and 2B illustrate a process flow for dynamically permitting and restricting access to and modification of computer resources, in accordance with an embodiment of the invention; and FIG. 3 illustrates a process flow for dynamically permitting and restricting access to and modification of computer resources, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As noted, an entity may maintain and/or operate one or more systems for running applications, processing data (e.g., batch processing and/or the like), providing services to users, and/or the like. When a change and/or modification needs to be made to one or more of the systems, applications, services, and/or the like, a user (e.g., a system administrator and/or the like) may implement the change and/or modification. To prevent unauthorized access, the one or more systems may include a privileged access system that requires the user to provide credentials before implementing the change and/or modification. The user may provide the credentials to the privileged access system, and the system may verify the credentials and prompt the user to enter a reason for needing access before providing the user with access. However, the reason entered by the user is simply included in a log and does not constrain the user's access in any way. Accordingly, the user, having unrestricted access, may perform actions that have negative consequences on the one or more systems, applications, services, and/or the like, such as starting and/or stopping services without a business justification and/or need, executing pre-requisite changes and/or change executions outside of a change window, implementing unauthorized changes, implementing change tasks ahead of a scheduled start and/or beyond an end time, performing pre-validation and/or post-validation outside an approved change window, executing missed commands during a change window, and/or the like. Such negative actions as well as the remedial actions required to correct the negative actions consume significant resources (e.g., financial resources, computing resources, network resources, and/or the like).

Some embodiments described herein provide a system, a computer program product, and/or a method for dynamically permitting and restricting access to and modification of computer resources. For example, a system (e.g., an electronic system for dynamically permitting and restricting access to and modification of computer resources and/or the like) may be configured to use machine learning to determine whether privileged access is required to modify computer resources (e.g., one or more of the systems, applications, services, and/or the like) and use blockchain to validate the modifications, permit the modifications to be made to the computer resources, and prevent modifications other than the validated modifications from being made.

In some embodiments, the system may include an integrated privileged access management tool that may create a verified privileged access network, integrate with an IT service management system, and may check validity of events, changes, and/or incidents associated with a change request. For example, the system may not permit access if an incident and/or an event is closed and/or if a change window has expired. Additionally, or alternatively, the system may validate each configuration item before a change window to identify the pre-state of each configuration item followed by a post validation.

In some embodiments, the system may prevent accidental actions from being performed on critical production systems and/or may ensure that failures are not repeated. Additionally, or alternatively, the system may minimize a likelihood of negative impacts, minimize un-authorized production changes and/or production outages, which may lead to negative reputational and/or operational consequences.

In some embodiments, the system may integrate a login process (e.g., a privileged account login process and/or the like) with event, incident, and/or change management modules of a service management system. Additionally, or alternatively, the system may provide implement a privileged access process that is end-to-end, proactive, verified, continuous, and fool-proof. For example, the system may generate authentication credentials to permit access to computer resources only after receiving a business justification related to an open event, incident, and/or change. In some embodiments, the system may validate and/or link a privileged session login to related configuration items (e.g., configuration items implemented, created, and/or the like during the privileged session login). Additionally, or alternatively, the system may include a validation engine that may detect change overlaps among multiple teams (e.g., teams of system administrators and/or the like). In some embodiments, the system may learn privilege access requirements (e.g., using a machine learning model) and may provide feedback regarding privilege access requirements to portions of the system and/or other systems, such as a service management system. Additionally, or alternatively, the system may use hashing, cryptography, blockchain, machine learning, and/or the like.

In this way, the system may prevent users with privileged access from performing actions that have negative consequences. By preventing users from performing such actions, the system may conserve resources (e.g., financial resources, computing resources, network resources, and/or the like) that would otherwise be consumed by the performance of such actions as well as the remedial actions required to detect and/or correct such actions.

As used herein, an "entity" may be any institution employing information technology resources and particularly technology infrastructure configured for processing large amounts of data. Typically, the data may be related to products, services, and/or the like offered and/or provided by the entity, customers of the entity, other aspect of the operations of the entity, people who work for the entity, and/or the like. As such, the entity may be an institution, group, association, financial institution, establishment, company, union, authority, merchant, service provider, and/or or the like, employing information technology resources for processing large amounts of data.

As used herein, a "user" may be an individual associated with an entity. As such, in some embodiments, the user may be an individual having past relationships, current relationships or potential future relationships with an entity. In some embodiments, a "user" may be an employee (e.g., an associate, a project manager, a manager, an administrator, an internal operations analyst, and/or the like) of the entity and/or enterprises affiliated with the entity, capable of operating systems described herein. In some embodiments, a "user" may be any individual, another entity, and/or a system who has a relationship with the entity, such as a customer, a prospective customer, and/or the like. In some embodiments, a user may be a system performing one or more tasks described herein.

As used herein, a "user interface" may be any device or software that allows a user to input information, such as commands and/or data, into a device, and/or that allows the device to output information to the user. For example, a user interface may include an application programmer interface (API), a graphical user interface (GUI), and/or an interface to input computer-executable instructions that direct a processing device to carry out functions. The user interface may employ input and/or output devices to input data received from a user and/or output data to a user. Input devices and/or output devices may include a display, API, mouse, keyboard, button, touchpad, touch screen, microphone, speaker, LED, light, joystick, switch, buzzer, bell, and/or other devices for communicating with one or more users.

As used herein, a "resource" may generally refer to objects, products, devices, goods, commodities, services, offers, discounts, currency, cash, cash equivalents, rewards, reward points, benefit rewards, bonus miles, cash back, credits, and/or the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, and/or the like.

As used herein, a "source retainer" may generally refer to an account, a system, and/or the like associated with a user and/or a type of resources, such as software, a checking account, a deposit account, a savings account, a credit account, a rewards account, a rewards points account, a benefit rewards account, a bonus miles account, a cash back account, and/or the like, which may be managed and/or maintained by an entity, such as a financial institution, an electronic resource transfer institution (e.g., a credit card company, a debit card company, a prepaid card company, and/or the like), a credit union, and/or the like.

As used herein, a "distribution" and/or an "allocation" may refer to any transaction, activities, and/or communication between one or more entities, between a user and one or more entities, and/or the like. A resource distribution and/or an allocation of resources may refer to any distribution of resources such as, but not limited to, a payment, processing of funds, purchase of goods or services, a return of goods or services, a payment transaction, a credit transaction, other interactions involving a user's resource or account, and/or the like. In the context of an entity such as a financial institution, a resource distribution and/or an allocation of resources may refer to one or more of a sale of goods and/or services, initiating an automated teller machine (ATM) or online financial session, an account balance inquiry, a rewards transfer, an account money transfer or withdrawal, opening a financial application on a user's computer or mobile device, a user accessing their e-wallet, any other interaction involving the user and/or the user's device that invokes and/or is detectable by the financial institution, and/or the like. In some embodiments, the user may authorize a resource distribution and/or an allocation of resources using a resource distribution instrument (e.g., credit cards, debit cards, checks, digital wallets, currency, loyalty points, and/or the like) and/or resource distribution credentials (e.g., account numbers, resource distribution instrument identifiers, and/or the like). A resource distribution and/or an allocation of resources may include one or more of the following: renting, selling, and/or leasing goods and/or services (e.g., groceries, stamps, tickets, DVDs, vending machine items, and/or the like); making payments to creditors (e.g., paying monthly bills; paying federal, state, and/or local taxes, and/or the like); sending remittances; loading money onto stored value cards (SVCs) and/or prepaid cards; donating to charities; and/or the like. Unless specifically limited by the context, a "resource distribution," an "allocation of resources," a "resource transfer," a "transaction," a "transaction event," and/or a "point of transaction event" may refer to any activity between a user, a merchant, an entity, and/or the like. In some embodiments, a resource distribution and/or an allocation of resources may refer to financial transactions involving direct or indirect movement of funds through traditional paper transaction processing systems (e.g., paper check processing) or through electronic transaction processing systems. In this regard, resource distributions and/or allocations of resources may refer to the user initiating a purchase for a product, service, or the like from a merchant. Typical financial resource distribution and/or financial allocations of resources include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points, and/or the like. When describing that resource transfers or transactions are evaluated, such descriptions may mean that the transaction has already occurred, is in the process of occurring or being processed, or has yet to be processed/posted by one or more financial institutions.

As used herein, "resource distribution instrument" may refer to an electronic payment vehicle, such as an electronic credit, debit card, and/or the like, associated with a source retainer (e.g., a checking account, a deposit account, a savings account, a credit account, and/or the like). In some embodiments, the resource distribution instrument may not be a "card" and may instead be account identifying information stored electronically in a user device, such as payment credentials and/or tokens and/or aliases associated with a digital wallet, account identifiers stored by a mobile application, and/or the like.

In some embodiments, the term "module" with respect to an apparatus may refer to a hardware component of the apparatus, a software component of the apparatus, and/or a component of the apparatus that includes both hardware and software. In some embodiments, the term "chip" may refer to an integrated circuit, a microprocessor, a system-on-a-chip, a microcontroller, and/or the like that may either be integrated into the external apparatus, may be inserted and/or removed from the external apparatus by a user, and/or the like.

As used herein, an "engine" may refer to core elements of a computer program, part of a computer program that serves as a foundation for a larger piece of software and drives the functionality of the software, and/or the like. An engine may be self-contained but may include externally controllable code that encapsulates powerful logic designed to perform or execute a specific type of function. In one aspect, an engine may be underlying source code that establishes file hierarchy, input and/or output methods, how a part of a computer program interacts and/or communicates with other software and/or hardware, and/or the like. The components of an engine may vary based on the needs of the computer program as part of the larger piece of software. In some embodiments, an engine may be configured to retrieve resources created in other computer programs, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system.

As used herein, a "component" of an application may include a software package, a service, a resource, a module, and/or the like that includes a set of related functions and/or data. In some embodiments, a component may provide a source capability (e.g., a function, a business function, and/or the like) to an application including the component. In some embodiments, components of an application may communicate with each other via interfaces and may provide information to each other indicative of the services and/or functions that other components may utilize and/or how other components may utilize the services and/or functions. Additionally, or alternatively, components of an application may be substitutable such that a component may replace another component. In some embodiments, components may include objects, collections of objects, and/or the like.

As used herein, "authentication credentials" may be any information that may be used to identify a user. For example, a system may prompt a user to enter authentication information such as a username, a password, a token, a personal identification number (PIN), a passcode, biometric information (e.g., voice authentication, a fingerprint, and/or a retina scan), an answer to a security question, a unique intrinsic user activity, such as making a predefined motion with a user device, and/or the like. The authentication information may be used to authenticate the identity of the user (e.g., determine that the authentication information is associated with an account) and/or determine that the user has authority to access an account or system. In some embodiments, the system may be owned and/or operated by an entity. In such embodiments, the entity may employ additional computer systems, such as authentication servers, to validate and certify resources inputted by a plurality of users within the system. The system may further use authentication servers to certify the identity of users of the system, such that other users may verify the identity of the certified users. In some embodiments, the entity may certify the identity of the users. Furthermore, authentication information and/or permission may be assigned to and/or required from a user, application, computing node, computing cluster, and/or the like to access stored data within at least a portion of the system.

As used herein, an "interaction" may refer to any communication between one or more users, one or more entities or institutions, and/or one or more devices, nodes, clusters, and/or systems within the system environment described herein. For example, an interaction may refer to a transfer of data between devices, an accessing of stored data by one or more nodes of a computing cluster, a transmission of a requested task, and/or the like. In some embodiments, an interaction may refer to an entity, a user, a system, and/or a device providing an advertisement, information, data, a user interface, and/or the like to another entity, another user, another system, and/or another device.

FIG. 1 presents an exemplary block diagram of a system environment 100 for dynamically permitting and restricting access to and modification of computer resources within a technical environment, in accordance with an embodiment of the invention. FIG. 1 provides a system environment 100 that includes specialized servers and a system communicably linked across a distributive network of nodes required to perform functions of process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device, a non-mobile computing device, and/or the like. The user may be a person who uses the user input system 140 to access, view modify, interact with, and/or the like information, data, images, video, and/or the like. The user may be a person who uses the user input system 140 to initiate, perform, monitor, and/or the like changes and/or modifications to one or more systems, applications, services, and/or the like. The one or more systems, applications, services, and/or the like may be configured to communicate with the system 130, input information onto a user interface presented on the user input system 140, and/or the like. The applications stored on the user input system 140 and the system 130 may incorporate one or more parts of any process flow described herein.

As shown in FIG. 1, the system 130 and the user input system 140 are each operatively and selectively connected to the network 110, which may include one or more separate networks. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology.

In some embodiments, the system 130 and the user input system 140 may be used to implement processes described herein, including user-side and server-side processes for dynamically permitting and restricting access to and modification of computer resources, in accordance with an embodiment of the present invention. The system 130 may represent various forms of digital computers, such as laptops, desktops, workstations, personal digital assistants, servers, blade servers, mainframes, and/or the like. The user input system 140 may represent various forms of mobile devices, such as personal digital assistants, cellular telephones, smartphones, smart glasses, and/or the like. The components shown here, their connections, their relationships, and/or their functions, are meant to be exemplary only, and are not meant to limit implementations of the inventions described and/or claimed in this document.

In some embodiments, the system 130 may include a processor 102, memory 104, a storage device 106, a high-speed interface 108 connecting to memory 104, high-speed expansion ports 111, and a low-speed interface 112 connecting to low-speed bus 114 and storage device 106. Each of the components 102, 104, 106, 108, 111, and 112 may be interconnected using various buses, and may be mounted on a common motherboard or in other manners as appropriate. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130 may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity.

The memory 104 may store information within the system 130. In one implementation, the memory 104 may be a volatile memory unit or units, such as volatile random-access memory (RAM) having a cache area for the temporary storage of information. In another implementation, the memory 104 may be a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 may be capable of providing mass storage for the system 130. In one aspect, the storage device 106 may be or contain a computer-readable medium, such as a floppy disk device, a hard disk device, an optical disk device, a tape device, a flash memory and/or other similar solid state memory device, and/or an array of devices, including devices in a storage area network or other configurations. A computer program product may be tangibly embodied in an information carrier. The computer program product may also contain instructions that, when executed, perform one or more methods, such as those described herein. The information carrier may be a non-transitory computer-readable or machine-readable storage medium, such as the memory 104, the storage device 106, and/or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 may manage bandwidth-intensive operations for the system 130, while the low-speed interface 112 and/or controller manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In some embodiments, low-speed interface 112 and/or controller is coupled to storage device 106 and low-speed bus 114 (e.g., expansion port). The low-speed bus 114, which may include various communication ports (e.g., USB, Bluetooth, Ethernet, wireless Ethernet), may be coupled to one or more input/output devices, such as a keyboard, a pointing device, a scanner, and/or a networking device such as a switch or router (e.g., through a network adapter).

The system 130 may be implemented in a number of different forms, as shown in FIG. 1. For example, it may be implemented as a standard server or multiple times in a group of such servers. Additionally, or alternatively, the system 130 may be implemented as part of a rack server system, a personal computer, such as a laptop computer, and/or the like. Alternatively, components from system 130 may be combined with one or more other same or similar systems and the user input system 140 may be made up of multiple computing devices communicating with each other.

FIG. 1 also illustrates a user input system 140, in accordance with an embodiment of the invention. The user input system 140 may include a processor 152, memory 154, an input/output device such as a display 156, a communication interface 158, and a transceiver 160, among other components, such as one or more image sensors. The user input system 140 may also be provided with a storage device, such as a microdrive and/or the like, to provide additional storage. Each of the components 152, 154, 158, and 160, may be interconnected using various buses, and several of the components may be mounted on a common motherboard or in other manners as appropriate.

The processor 152 may be configured to execute instructions within the user input system 140, including instructions stored in the memory 154. The processor 152 may be implemented as a chipset of chips that include separate and multiple analog and/or digital processors. The processor 152 may be configured to provide, for example, for coordination of the other components of the user input system 140, such as control of user interfaces, applications run by user input system 140, and/or wireless communication by user input system 140.

The processor 152 may be configured to communicate with the user through control interface 164 and display interface 166 coupled to a display 156. The display 156 may be, for example, a Thin-Film-Transistor Liquid Crystal Display (TFT LCD) or an Organic Light Emitting Diode (OLED) display, and/or other appropriate display technology. An interface of the display 156 may include appropriate circuitry and may be configured for driving the display 156 to present graphical and other information to a user. The control interface 164 may receive commands from a user and convert them for submission to the processor 152. In addition, an external interface 168 may be provided in communication with processor 152 to enable near area communication of user input system 140 with other devices. External interface 168 may provide, for example, for wired communication in some implementations, or for wireless communication in other implementations, and multiple interfaces may also be used.

The memory 154 may store information within the user input system 140. The memory 154 may be implemented as one or more of a computer-readable medium or media, a volatile memory unit or units, or a non-volatile memory unit or units. Expansion memory may also be provided and connected to user input system 140 through an expansion interface (not shown), which may include, for example, a Single In Line Memory Module (SIMM) card interface. Such expansion memory may provide extra storage space for user input system 140 and/or may store applications and/or other information therein. In some embodiments, expansion memory may include instructions to carry out or supplement the processes described above and/or may include secure information. For example, expansion memory may be provided as a security module for user input system 140 and may be programmed with instructions that permit secure use of user input system 140. Additionally, or alternatively, secure applications may be provided via the SIMM cards, along with additional information, such as placing identifying information on the SIMM card in a secure manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In some embodiments, a computer program product may be tangibly embodied in an information carrier. The computer program product may contain instructions that, when executed, perform one or more methods, such as those described herein. The information carrier may be a computer-readable or machine-readable medium, such as the memory 154, expansion memory, memory on processor 152, and/or a propagated signal that may be received, for example, over transceiver 160 and/or external interface 168.

In some embodiments, the user may use the user input system 140 to transmit and/or receive information and/or commands to and/or from the system 130. In this regard, the system 130 may be configured to establish a communication link with the user input system 140, whereby the communication link establishes a data channel (wired and/or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, and/or the like.

The user input system 140 may communicate with the system 130 (and one or more other devices) wirelessly through communication interface 158, which may include digital signal processing circuitry. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker (e.g., in a handset) of user input system 140. Such sound may include sound from voice telephone calls, may include recorded sound (e.g., voice messages, music files, and/or the like) and may also include sound generated by one or more applications operating on the user input system 140, and in some embodiments, one or more applications operating on the system 130.

Various implementations of the systems and techniques described here may be realized in digital electronic circuitry, integrated circuitry, specially designed ASICs (application specific integrated circuits), computer hardware, firmware, software, and/or combinations thereof. Such various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and/or at least one output device.

Computer programs (e.g., also referred to as programs, software, applications, code, and/or the like) may include machine instructions for a programmable processor, and may be implemented in a high-level procedural and/or object-oriented programming language, and/or in assembly/machine language. As used herein, the terms "machine-readable medium" and/or "computer-readable medium" may refer to any computer program product, apparatus and/or device (e.g., magnetic discs, optical disks, memory, Programmable Logic Devices (PLDs), and/or the like) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and/or techniques described herein may be implemented on a computer having a display device (e.g., a CRT (cathode ray tube), an LCD (liquid crystal display) monitor, and/or the like) for displaying information to the user, a keyboard by which the user may provide input to the computer, and/or a pointing device (e.g., a mouse or a trackball) by which the user may provide input to the computer. Other kinds of devices may be used to provide for interaction with a user as well. For example, feedback provided to the user may be any form of sensory feedback (e.g., visual feedback, auditory feedback, and/or tactile feedback). Additionally, or alternatively, input from the user may be received in any form, including acoustic, speech, and/or tactile input.

The systems and techniques described herein may be implemented in a computing system that includes a back end component (e.g., as a data server), that includes a middleware component (e.g., an application server), that includes a front end component (e.g., a client computer having a graphical user interface or a Web browser through which a user may interact with an implementation of the systems and techniques described here), and/or any combination of such back end, middleware, and/or front end components. Components of the system may be interconnected by any form or medium of digital data communication (e.g., a communication network). Examples of communication networks include a local area network ("LAN"), a wide area network ("WAN"), and/or the Internet.

In some embodiments, computing systems may include clients and servers. A client and server may generally be remote from each other and typically interact through a communication network. The relationship of client and server may arise by virtue of computer programs running on the respective computers and having a client-server relationship to each other.

The embodiment of the system environment 100 illustrated in FIG. 1 is exemplary and other embodiments may vary. As another example, in some embodiments, the system 130 includes more, less, or different components. As another example, in some embodiments, some or all of the portions of the system environment 100, the system 130, and/or the user input system 140 may be combined into a single portion. Likewise, in some embodiments, some or all of the portions of the system environment 100, the system 130, and/or the user input system 140 may be separated into two or more distinct portions.

In some embodiments, the system environment may 100 include one or more user input systems and/or one or more privileged access management systems (e.g., similar to the system 130 and/or the user input system 140) associated with an entity (e.g., a business, a merchant, a financial institution, a card management institution, an software and/or hardware development company, a software and/or hardware testing company, and/or the like). For example, a user (e.g., an employee, a customer, and/or the like) may use a user input system (e.g., similar to the user input system 140) to initiate a change and/or a modification to one or more of the systems, applications, services, and/or the like (e.g., similar to the system 130, running a system similar to the system 130, and/or the like). In some embodiments, the user input system and/or the privileged access management system associated with the entity may perform one or more of the steps described herein with respect to the process flow described herein with respect to FIGS. 2A, 2B, and/or 3.

FIGS. 2A and 2B illustrate a process flow 200 for dynamically permitting and restricting access to and modification of computer resources within a technical environment, in accordance with an embodiment of the invention. In some embodiments, a privileged access management system and/or the like (e.g., similar to one or more of the systems described herein with respect to FIG. 1) may perform one or more of the steps of process flow 200.

As shown in FIG. 2A, the process flow 200 may include a service management system 202 including a service management tool 204 and a privilege access detection engine 210 including a data processing system 212 and a model engineering system 216. As also shown in FIG. 2A, the data processing system 212 may include a processing engine, and the model engineering system 216 may include an artificial intelligence (AI) engine 218. As shown in FIG. 2B, the process flow 200 may include a system administrator 220, a verified privilege access network 230, and a server 240.

In some embodiments, the process flow 200 may include the service management tool 204 providing, to the privilege access detection engine 210, a request including event information, incident information, change request information, and/or the like. For example, the service management tool 204 may receive a request including event information, incident information, change request information, and/or the like from a user device (e.g., associated with a system administrator, such as the system administrator 220, and/or the like), and the service management tool 204 may provide the request to the privilege access detection engine 210 to determine whether privilege access is required for the request and/or the like.

In some embodiments, the process flow 200 may include the privilege access detection engine 210 verifying configuration items in the request and validating and/or determine if privileged login/access is required (e.g., to process the request). Additionally, or alternatively, the privilege access detection engine 210 may be a self-learning engine and may share feedback with the service management tool 204 if a configuration item does not require privilege access.

As shown in FIG. 2B, the process flow 200 may include the system administrator 220 using the privileged access login (e.g., attempting to login with privileged credentials), which passes the login information to the verified privilege access network 230. In some embodiments, and as shown in FIG. 2B, the verified privilege access network 230 may use a blockchain in which each block/team in the chain uses hashing and a public/private key to provide approval for its content. As shown in FIG. 2B, the approved file version may move from one block to another, and each block may consume the content received from the previous block and supplement/append the previous block by creating a new version of the content. In some embodiments, the blocks may not alter the content received from a predecessor block (e.g., due to encryption using a private key). Additionally, or alternatively, each block's exposure may be only limited to its predecessor block's content, and each file version produced may be authenticated, validated, immutable, non-repudiated, and/or the like.

For example, and as shown in FIG. 2B, in Hash 0 the verified privilege access network 230 may populate a config item (e.g., a configuration item) based on the request from the service management tool 204, such as information from a configuration management database (CMDB), and/or the like. The verified privilege access network 230 may encrypt the config item to generate a file referred to in FIG. 2B as "Config Version 1." In Hash 1, the verified privilege access network 230 may verify the configuration and overlap requests, and, based on verifying the configuration and overlap requests, the verified privilege access network 230 may encrypt Hash 0 to generate another file referred to in FIG. 2B as "Config Version 2." In Hash 2, the verified privilege access network 230 may verify the privileged access login (e.g., based on the privileged credentials), and, based on verifying the privileged access login, encrypt Hash 1 to generate another file referred to in FIG. 2B as "Config Version 3." In some embodiments, and as shown in FIG. 2B, the verified privilege access network 230 may provide the final version of the config item, such as "Config Version 3," which may include validated configuration items, validated request conflicts/overlaps, and the complete and validated privilege login details, to the server 240 and may be allowed to access the server 240.

Process flow 200 may include additional embodiments, such as any single embodiment or any combination of embodiments described below and/or in connection with one or more other processes described elsewhere herein. Although FIGS. 2A and 2B show example blocks of process flow 200, in some embodiments, process flow 200 may include additional blocks, fewer blocks, different blocks, or differently arranged blocks than those depicted in FIGS. 2A and 2B. Additionally, or alternatively, two or more of the blocks of process flow 200 may be performed in parallel.

FIG. 3 illustrates a process flow 300 for dynamically permitting and restricting access to and modification of computer resources within a technical environment, in accordance with an embodiment of the invention. In some embodiments, an integrated privilege access management system and/or the like (e.g., similar to one or more of the systems described herein with respect to FIG. 1) may perform one or more of the steps of process flow 300.

As shown in block 302, the process flow 300 may include receiving a change request identifying computer resources to be modified. For example, an integrated privilege access management system may receive a change request identifying computer resources to be modified.

As shown in block 304, the process flow 300 may include determining, using a machine learning model and based on the change request, whether privileged access is required to modify the computer resources. For example, an integrated privilege access management system may determine, using a machine learning model and based on the change request, whether privileged access is required to modify the computer resources.

As shown in block 306, the process flow 300 may include receiving, based on determining that privileged access is required to modify the computer resources, credentials from a user device. For example, an integrated privilege access management system may receive, based on determining that privileged access is required to modify the computer resources, credentials from a user device.

As shown in block 308, the process flow 300 may include generating, based on the change request, a first encrypted configuration file. For example, an integrated privilege access management system may generate, based on the change request, a first encrypted configuration file.

As shown in block 310, the process flow 300 may include determining, based on the change request and based on a service management database, whether the change request is valid. For example, an integrated privilege access management system may determine, based on the change request and based on a service management database, whether the change request is valid.

As shown in block 312, the process flow 300 may include generating, based on determining that the change request is valid, a second encrypted configuration file by encrypting the first encrypted configuration file. For example, an integrated privilege access management system may generate, based on determining that the change request is valid, a second encrypted configuration file by encrypting the first encrypted configuration file.

As shown in block 314, the process flow 300 may include determining, based on the credentials and a credential management database, whether the credentials authorize access to the computer resources identified by the change request. For example, an integrated privilege access management system may determine, based on the credentials and a credential management database, whether the credentials authorize access to the computer resources identified by the change request.

As shown in block 316, the process flow 300 may include generating, based on determining that the credentials authorize access to the computer resources identified by the change request, a third encrypted configuration file by encrypting the second encrypted configuration file. For example, an integrated privilege access management system may generate, based on determining that the credentials authorize access to the computer resources identified by the change request, a third encrypted configuration file by encrypting the second encrypted configuration file.

As shown in block 318, the process flow 300 may include permitting, based on the third encrypted configuration file, the user device to modify the computer resources identified by the change request. For example, an integrated privilege access management system may permit, based on the third encrypted configuration file, the user device to modify the computer resources identified by the change request.

As shown in block 320, the process flow 300 may include preventing, based on the third encrypted configuration file, the user device from modifying other computer resources that are not the computer resources identified by the change request. For example, an integrated privilege access management system may prevent, based on the third encrypted configuration file, the user device from modifying other computer resources that are not the computer resources identified by the change request.

Process flow 300 may include additional embodiments, such as any single embodiment or any combination of embodiments described below and/or in connection with one or more other processes described elsewhere herein.

In a first embodiment, the change request may include information identifying an event associated with modifying the computer resources, an incident associated with modifying the computer resources, a modification to be performed on the computer resources, and/or the like.

In a second embodiment alone or in combination with the first embodiment, the change request may include information provided by the user device to a service management tool.

In a third embodiment alone or in combination with any of the first through second embodiments, the change request may identify modifications to be made to the computer resources, the first encrypted configuration file may include data identifying the modifications to be made to the computer resources, and the process flow 300 may include permitting, based on the third encrypted configuration file, the user device to perform the modifications on the computer resources and preventing, based on the third encrypted configuration file, the user device from performing modifications other than the modifications identified in the change request.

In a fourth embodiment alone or in combination with any of the first through third embodiments, the process flow 300 may include, when receiving the change request, receiving the change request from a service management system.

In a fifth embodiment alone or in combination with any of the first through fourth embodiments, the process flow 300 may include, when determining whether privileged access is required to modify the computer resources, transforming data associated with the change request to obtained transformed data, normalizing the data associated with the change request to obtain normalized data, cleaning the data associated with the change request to obtain clean data, processing the transformed data, the normalized data, and the cleaned data to obtain processed data, providing, to the machine learning model, the processed data, where the machine learning model is configured to determine, based on the processed data, whether privileged access is required to modify the computer resources, and where the machine learning model is trained based on historical data associated with change requests and historical determinations of whether privileged access is required.

In a sixth embodiment alone or in combination with any of the first through fifth embodiments, the process flow 300 may include, when determining whether privileged access is required to modify the computer resources, parsing, using a natural language parser, the processed data to determine whether privileged access is required to modify the computer resources.

In a seventh embodiment alone or in combination with any of the first through sixth embodiments, the machine learning model may include a random forest classifier.

In an eighth embodiment alone or in combination with any of the first through seventh embodiments, the process flow 300 may include, when determining whether privileged access is required to modify the computer resources, processing the change request using a privilege access detection engine including the machine learning model and a natural language parser.

In a ninth embodiment alone or in combination with any of the first through eighth embodiments, the process flow 300 may include permitting, based on determining that privileged access is not required to modify the computer resources, the user device to modify the computer resources identified by the change request.

In a tenth embodiment alone or in combination with any of the first through ninth embodiments, the process flow 300 may include, when generating the first encrypted configuration file, generating the first encrypted configuration file based on data provided by the user device to a configuration management database.

In an eleventh embodiment alone or in combination with any of the first through tenth embodiments, the process flow 300 may include, based on determining that the change request is not valid, preventing the user device from modifying the computer resources identified by the change request and providing a notification to the user device indicating that the change request is not valid.

In a twelfth embodiment alone or in combination with any of the first through eleventh embodiments, the change request may include information identifying an event associated with modifying the computer resources, an incident associated with modifying the computer resources, a modification to be performed on the computer resources, and/or the like and the process flow 300 may include determining, based on the service management database, whether the event is a valid event, determining, based on the service management database, whether the incident is a valid incident, determining, based on the service management database, whether the modification to be performed on the computer resources conflicts with another service, determining, based on the service management database, whether the modification to be performed on the computer resources overlaps with another service, and/or the like.

In a thirteenth embodiment alone or in combination with any of the first through twelfth embodiments, the process flow 300 may include, when generating the first encrypted configuration file, encrypting, using a first public key and a first private key, a configuration file including data provided by the user device to a configuration management database to generate the first encrypted configuration file, when generating the second encrypted configuration file, encrypting, using a second public key and a second private key, the first encrypted configuration file to generate the second encrypted configuration file, and when generating the third encrypted configuration file, encrypting, using a third public key and a third private key, the second encrypted configuration file to generate the third encrypted configuration file.

In a fourteenth embodiment alone or in combination with any of the first through thirteenth embodiments, the process flow 300 may include, when determining whether the change request is valid, decrypting, using the first public key, the first encrypted configuration file to access the data of the configuration file and, when determining whether the credentials authorize access to the computer resources identified by the change request, decrypting, using the second public key, the second encrypted configuration file and decrypting, using the first public key, the first encrypted configuration file to access the data of the configuration file.

In a fifteenth embodiment alone or in combination with any of the first through fourteenth embodiments, the process flow 300 may be performed by a system that includes a service management system configured to receive the change request and receive the credentials from the user device, a privilege access detection engine configured to determine whether privileged access is required to modify the computer resources, and a privilege access network configured to generate the first encrypted configuration file, determine whether the change request is valid, generate the second encrypted configuration file, determine whether the credentials authorize access to the computer resources identified by the change request, and generate the third encrypted configuration file.

In a sixteenth embodiment alone or in combination with any of the first through fifteenth embodiments, the process flow 300 may include, when generating the first encrypted configuration file, generating a first block of a blockchain, where the first block includes the first encrypted configuration file, when generating the second encrypted configuration file, generating a second block of the block chain, where the second block includes the second encrypted configuration file, and, when generating the third encrypted configuration file, generating a third block of the block chain, where the third block includes the third encrypted configuration file.

Although FIG. 3 shows example blocks of process flow 300, in some embodiments, process flow 300 may include additional blocks, fewer blocks, different blocks, or differently arranged blocks than those depicted in FIG. 3. Additionally, or alternatively, two or more of the blocks of process flow 300 may be performed in parallel.

In some embodiments, the system may decrypt the third encrypted configuration file and perform the modification on the computer resources. For example, the system may decrypt the third encrypted configuration file and execute the configuration file to implement the modification to the computer resources.

As noted above, in some embodiments, the process flow 200 and/or the process flow 300 may include performing one or more of the functions described herein using machine learning and/or a machine learning model. For example, the system may provide data from change requests and/or the like to a machine learning model trained (e.g., using historical data) to output determinations of whether privileged access is required.

In some embodiments, the system may be configured to implement any of the following applicable machine learning algorithms either singly or in combination: supervised learning (e.g., using logistic regression, using back propagation neural networks, using random forests, decision trees, and/or the like), unsupervised learning (e.g., using an Apriori algorithm, using K-means clustering), semi-supervised learning, reinforcement learning (e.g., using a Q-learning algorithm, using temporal difference learning), and any other suitable learning style. Each module of the system may implement any one or more of: a regression algorithm (e.g., ordinary least squares, logistic regression, stepwise regression, multivariate adaptive regression splines, locally estimated scatterplot smoothing, and/or the like), an instance-based method (e.g., k-nearest neighbor, learning vector quantization, self-organizing map, and/or the like), a regularization method (e.g., ridge regression, least absolute shrinkage and selection operator, elastic net, and/or the like), a decision tree learning method (e.g., classification and regression tree, iterative dichotomiser 3, C4.5, chi-squared automatic interaction detection, decision stump, random forest, multivariate adaptive regression splines, gradient boosting machines, and/or the like), a Bayesian method (e.g., naïve Bayes, averaged one-dependence estimators, Bayesian belief network, and/or the like), a kernel method (e.g., a support vector machine, a radial basis function, an LDA, and/or the like), a clustering method (e.g., k-means clustering, expectation maximization, and/or the like), an associated rule learning algorithm (e.g., an Apriori algorithm, an Eclat algorithm, and/or the like), an artificial neural network model (e.g., a Perceptron method, a back-propagation method, a Hopfield network method, a self-organizing map method, a learning vector quantization method, and/or the like), a deep learning algorithm (e.g., a restricted Boltzmann machine, a deep belief network method, a convolution network method, a stacked auto-encoder method, and/or the like), a dimensionality reduction method (e.g., principal component analysis, partial least squares regression, Sammon mapping, multidimensional scaling, projection pursuit, and/or the like), an ensemble method (e.g., boosting, bootstrapped aggregation, AdaBoost, stacked generalization, gradient boosting machine method, random forest method, and/or the like), and any suitable form of machine learning algorithm. Each processing portion of the system may additionally or alternatively leverage a probabilistic module, heuristic module, deterministic module, or any other suitable module leveraging any other suitable computation method, machine learning method or combination thereof. However, any suitable machine learning approach may otherwise be incorporated in the system. Further, any suitable model (e.g., machine learning, non-machine learning, and/or the like) may be used in generating data relevant to the system. In some embodiments, the one or more machine learning algorithms may be predictive modeling algorithms configured to use data and statistics to predict outcomes with forecasting models.

In some embodiments, the machine learning model may be generated by training on historical data associated with change requests, historical determinations of whether privileged access is required, and/or the like over a predetermined past period of time. In doing so, the system may be configured to generate determinations of whether privileged access is required and/or the like. In some embodiments, the one or more machine learning algorithms may be used to calculate likelihoods of privileged access being required, and whether the likelihood satisfies a threshold.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that may direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the invention. Therefore, it is to be understood that, within the scope of the appended claims, the invention may be practiced other than as specifically described herein.

What is claimed is:

1. A system for dynamically permitting and restricting access to and modification of computer resources, the system comprising:
    at least one non-transitory storage device; and
    at least one processing device coupled to the at least one non-transitory storage device, wherein the at least one processing device is configured to:
        receive a change request identifying computer resources to be modified;
        determine, using a machine learning model and based on the change request, whether privileged access is required to modify the computer resources;
        receive, based on determining that privileged access is required to modify the computer resources, credentials from a user device;
        generate, based on the change request, a first encrypted configuration file;
        determine, based on the change request and based on a service management database, whether the change request is valid;
        generate, based on determining that the change request is valid, a second encrypted configuration file by encrypting the first encrypted configuration file;
        determine, based on the credentials and a credential management database, whether the credentials authorize access to the computer resources identified by the change request;
        generate, based on determining that the credentials authorize access to the computer resources identified by the change request, a third encrypted configuration file by encrypting the second encrypted configuration file;
        permit, based on the third encrypted configuration file, the user device to modify the computer resources identified by the change request; and prevent, based on the third encrypted configuration file, the user device from modifying other computer resources that are not the computer resources identified by the change request.

2. The system of claim 1, wherein the change request comprises information identifying an event associated with modifying the computer resources, an incident associated with modifying the computer resources, and a modification to be performed on the computer resources.

3. The system of claim 1, wherein the change request comprises information provided by the user device to a service management tool.

4. The system of claim 1, wherein the change request identifies modifications to be made to the computer resources, wherein the first encrypted configuration file comprises data identifying the modifications to be made to the computer resources, and wherein the at least one processing device is further configured to:
permit, based on the third encrypted configuration file, the user device to perform the modifications on the computer resources; and
prevent, based on the third encrypted configuration file, the user device from performing modifications other than the modifications identified in the change request.

5. The system of claim 1, wherein the at least one processing device is further configured to, when receiving the change request, receive the change request from a service management system.

6. The system of claim 1, wherein the at least one processing device is further configured to, when determining whether privileged access is required to modify the computer resources:
transform data associated with the change request to obtained transformed data;
normalize the data associated with the change request to obtain normalized data;
clean the data associated with the change request to obtain clean data;
process the transformed data, the normalized data, and the cleaned data to obtain processed data; and
provide, to the machine learning model, the processed data, wherein the machine learning model is configured to determine, based on the processed data, whether privileged access is required to modify the computer resources, and wherein the machine learning model is trained based on historical data associated with change requests and historical determinations of whether privileged access is required.

7. The system of claim 6, wherein the at least one processing device is further configured to, when determining whether privileged access is required to modify the computer resources, parse, using a natural language parser, the processed data to determine whether privileged access is required to modify the computer resources.

8. The system of claim 1, wherein the machine learning model comprises a random forest classifier.

9. The system of claim 1, wherein the at least one processing device is further configured to, when determining whether privileged access is required to modify the computer resources, process the change request using a privilege access detection engine comprising the machine learning model and a natural language parser.

10. The system of claim 1, wherein the at least one processing device is further configured to permit, based on determining that privileged access is not required to modify the computer resources, the user device to modify the computer resources identified by the change request.

11. The system of claim 1, wherein the at least one processing device is further configured to, when generating the first encrypted configuration file, generate the first encrypted configuration file based on data provided by the user device to a configuration management database.

12. The system of claim 1, wherein the at least one processing device is further configured to, based on determining that the change request is not valid:
prevent the user device from modifying the computer resources identified by the change request; and
provide a notification to the user device indicating that the change request is not valid.

13. The system of claim 1, wherein the change request comprises information identifying an event associated with modifying the computer resources, an incident associated with modifying the computer resources, and a modification to be performed on the computer resources, and wherein the at least one processing device is further configured to, when determining whether the change request is valid:
determine, based on the service management database, whether the event is a valid event;
determine, based on the service management database, whether the incident is a valid incident;
determine, based on the service management database, whether the modification to be performed on the computer resources conflicts with another service; and
determine, based on the service management database, whether the modification to be performed on the computer resources overlaps with another service.

14. The system of claim 1, wherein the at least one processing device is further configured to:
when generating the first encrypted configuration file, encrypt, using a first public key and a first private key, a configuration file comprising data provided by the user device to a configuration management database to generate the first encrypted configuration file;
when generating the second encrypted configuration file, encrypt, using a second public key and a second private key, the first encrypted configuration file to generate the second encrypted configuration file; and
when generating the third encrypted configuration file, encrypt, using a third public key and a third private key, the second encrypted configuration file to generate the third encrypted configuration file.

15. The system of claim 14, wherein the at least one processing device is further configured to:
when determining whether the change request is valid, decrypt, using the first public key, the first encrypted configuration file to access the data of the configuration file; and
when determining whether the credentials authorize access to the computer resources identified by the change request:
decrypt, using the second public key, the second encrypted configuration file; and
decrypt, using the first public key, the first encrypted configuration file to access the data of the configuration file.

16. The system of claim 1, comprising:
a service management system configured to receive the change request and receive the credentials from the user device;
a privilege access detection engine configured to determine whether privileged access is required to modify the computer resources; and
a privilege access network configured to generate the first encrypted configuration file, determine whether the change request is valid, generate the second encrypted configuration file, determine whether the credentials authorize access to the computer resources identified by the change request, and generate the third encrypted configuration file.

17. The system of claim 1, wherein the at least one processing device is further configured to:
- when generating the first encrypted configuration file, generate a first block of a blockchain, wherein the first block comprises the first encrypted configuration file;
- when generating the second encrypted configuration file, generate a second block of the block chain, wherein the second block comprises the second encrypted configuration file; and
- when generating the third encrypted configuration file, generate a third block of the block chain, wherein the third block comprises the third encrypted configuration file.

18. A computer program product for dynamically permitting and restricting access to and modification of computer resources, the computer program product comprising a non-transitory computer-readable medium comprising code causing a first apparatus to:
- receive a change request identifying computer resources to be modified;
- determine, using a machine learning model and based on the change request, whether privileged access is required to modify the computer resources;
- receive, based on determining that privileged access is required to modify the computer resources, credentials from a user device;
- generate, based on the change request, a first encrypted configuration file;
- determine, based on the change request and based on a service management database, whether the change request is valid;
- generate, based on determining that the change request is valid, a second encrypted configuration file by encrypting the first encrypted configuration file;
- determine, based on the credentials and a credential management database, whether the credentials authorize access to the computer resources identified by the change request;
- generate, based on determining that the credentials authorize access to the computer resources identified by the change request, a third encrypted configuration file by encrypting the second encrypted configuration file;
- permit, based on the third encrypted configuration file, the user device to modify the computer resources identified by the change request; and
- prevent, based on the third encrypted configuration file, the user device from modifying other computer resources that are not the computer resources identified by the change request.

19. The computer program product of claim 18, wherein the change request comprises information identifying an event associated with modifying the computer resources, an incident associated with modifying the computer resources, and a modification to be performed on the computer resources.

20. A method for dynamically permitting and restricting access to and modification of computer resources, the method comprising:
- receiving a change request identifying computer resources to be modified;
- determining, using a machine learning model and based on the change request, whether privileged access is required to modify the computer resources;
- receiving, based on determining that privileged access is required to modify the computer resources, credentials from a user device;
- generating, based on the change request, a first encrypted configuration file;
- determining, based on the change request and based on a service management database, whether the change request is valid;
- generating, based on determining that the change request is valid, a second encrypted configuration file by encrypting the first encrypted configuration file;
- determining, based on the credentials and a credential management database, whether the credentials authorize access to the computer resources identified by the change request;
- generating, based on determining that the credentials authorize access to the computer resources identified by the change request, a third encrypted configuration file by encrypting the second encrypted configuration file;
- permitting, based on the third encrypted configuration file, the user device to modify the computer resources identified by the change request; and
- preventing, based on the third encrypted configuration file, the user device from modifying other computer resources that are not the computer resources identified by the change request.

* * * * *